US008769284B2

(12) United States Patent
Ginzboorg et al.

(10) Patent No.: US 8,769,284 B2
(45) Date of Patent: Jul. 1, 2014

(54) SECURING COMMUNICATION (75) Inventors: Philip Ginzboorg, Espoo (FI); Sampo Sovio, Riihimaki (FI); Nadarajah Asokan, Espoo (FI)

(73) Assignee: Nokia Corporation, Espoo (FI)

(*) Notice: Subject to any disclaimer, the term of this patent is extended or adjusted under 35 U.S.C. 154(b) by 770 days.

(21) Appl. No.: 11/618,537

(22) Filed: Dec. 29, 2006

(65) Prior Publication Data
US 2008/0162935 A1 Jul. 3, 2008

(51) Int. Cl.
*H04L 9/32* (2006.01)
(52) U.S. Cl.
USPC .......................... 713/170; 380/270
(58) Field of Classification Search
USPC .......................... 713/170; 380/270
See application file for complete search history.

(56) References Cited

U.S. PATENT DOCUMENTS

| 6,760,752 | B1 * | 7/2004 | Liu et al. ................. 709/206 |
| 6,886,096 | B2 * | 4/2005 | Appenzeller et al. ...... 713/170 |
| 6,968,571 | B2 * | 11/2005 | Devine et al. ............. 726/11 |
| 7,203,837 | B2 * | 4/2007 | O'Shea et al. ............ 713/170 |
| 7,239,701 | B1 * | 7/2007 | Ogishi et al. ............. 380/44 |
| 7,370,350 | B1 * | 5/2008 | Salowey .................... 726/7 |
| 7,571,471 | B2 * | 8/2009 | Sandhu et al. ............ 726/17 |
| 7,814,533 | B2 * | 10/2010 | Devine et al. ............. 726/3 |
| 7,827,409 | B2 * | 11/2010 | Fascenda ................ 713/171 |

| 2003/0211842 | A1 * | 11/2003 | Kempf et al. .............. 455/411 |
| 2004/0044792 | A1 | 3/2004 | Sjollema et al. |
| 2004/0151312 | A1 | 8/2004 | Yanagisawa |
| 2005/0076214 | A1 * | 4/2005 | Thomas et al. ............ 713/170 |
| 2005/0223226 | A1 * | 10/2005 | Sundararajan ............. 713/168 |
| 2007/0178885 | A1 * | 8/2007 | Lev ........................ 455/411 |
| 2007/0274522 | A1 * | 11/2007 | Boman et al. ............. 380/247 |
| 2008/0016230 | A1 * | 1/2008 | Holtmanns et al. ........ 709/229 |

OTHER PUBLICATIONS

Menezes A J et al: Handbook of Applied Cryptography Handbood of Applied Cryptography, Boca Raton, FL, CRC Press.; US, US, Jan. 1, 1997, p. 500-502,506-508, 546-547, 551-554,561-562, XP002490453 ISBN: 978-0-8493-8523-0 paragraph [12.3.2.1] paragraph[12.5]-paragraph [12.5.1] paragraph[13.2.3] paragraph[l3.3.1]-paragraph 13.3.2.1] paragraph [13.4.3].

Schneier Bruce Ed—Schneier B: "Applied cryptography" Applied Cryptography. Protcolos, Algorithms, and Source Code in C, New York, John Wiley & Sons, US,—Jan. 1, 1996, p. 31-34, 51,115, XP002490454 ISBN: 978-0-471-11709-4 p. 31, line 16—p. 34, line 2 p. 51, line 1-line 18 p. 115, line 3-last line.

Seth A et al: "Practical security for disconnected nodes" Secure Network Protocols, 2005. (NPSEC). 1$^{st}$ IEEE ICNP Workshop on Boston Massachusetts, USA Nov. 6, 2005, Piscataway, NJ USA, IEEE, Nov. 6, 2005, pp. 31-36, xp010852626 ISBN: 978-0-7803-9427-8.

(Continued)

*Primary Examiner* — Amare F Tabor
(74) *Attorney, Agent, or Firm* — Harrington & Smith (57) ABSTRACT

An apparatus comprising a processor, the processor configured to select a first cryptographic key, encrypt a message with the first cryptographic key to produce a first encrypted message, and further encrypt the first cryptographic key and an identifier of a second apparatus with a first encryption key to form a second encrypted message.

32 Claims, 5 Drawing Sheets

(56) References Cited

OTHER PUBLICATIONS

Cao F et al: "Providing Secure Services in Peer-to Peer Communications Networks with Central Security Servers" Telecommunications, 2005. AICT-ICIW '06. International Conference on Internet and Web Applications and Services/Advanced International Conference on Guadeloupe, French Caribbean Feb. 19-25, 2006, Piscataway, NJ, USA, IEEE, Feb. 19, 2006, pp. 105-110, XP002385023 ISBN: 978-0-7695-2522-8.

Digital cellular telecommunications system (Phase 2+); Universal Mobile Telecommunications System (UMTS); Generic Authentication Architecture (GAA); Generic bootstrapping architecture (3GPP TS 33.220 version 7.6.0 Release 7); ETSI TS 133 220 ETSI Standards, LIS, Sophia Antipolis Cedex France, vol. 3-SA3, No. V7.6.0 Dec. 1, 2006, XP014036443.

PCT Search Report dated Aug. 12, 2008 for PCT Application PCT/EP2007/063692.

3GPP TS 33.222 V7.2.0 (Sep. 2006), Technical Specification, $3^{rd}$ Generation Partnership Project; Technical Specification Group Services and System Aspects; Generic Authentication Architecture (GAA); Accessto Network Application Functions Using Hypertext Transfer Protocol Over Transport Layer Security (HTTPS), (Release 7), (21 pages).

3GPP TS 33.320 V1.0.0 (Sep. 2009), Technical Specification, $3^{rd}$ Generation Partnership Project; Technical Specification Group Services and System Aspects; 3GPP Security Aspect of Home NodeB and Home eNodeB; Release 9, (29 pages).

\* cited by examiner

SECURING COMMUNICATION

FIELD OF THE INVENTION

The present disclosure relates to an Apparatus in a communications system, and more particularly, but not exclusively, to apparatus sending and receiving encrypted messages in a communications system.

BACKGROUND INFORMATION

A communication system can be seen as a facility that enables communication sessions or data sessions between entities such as user equipment and/or other nodes associated with the communication system. The communication may comprise, for example, communication of voice, data, multimedia and so on. A user equipment connected to a communication system may, for example, be provided with a two-way telephone call or multi-way conference call or with a data connection. In addition voice call services, various other services, for example enhanced content services such as multimedia services or other data services, security services may be provided for a user. A user equipment may communicate data to and from a server entity, or between two or more user equipments.

A communication system typically operates in accordance with a given standard or specification, which sets out what the various entities associated with the system are permitted to do and how that should be achieved. Communication protocols, parameters, functions, reference points and interfaces, which shall be used for a connection, are typically defined by the standards or specifications.

Communication systems providing wireless communication for user equipment are known. These systems are commonly referred to as mobile systems, although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN), Personal Area Networks (PAN), Wide Area Networks (WAN) or some other form of network.

In a wireless system an access node provides user equipment with access to the communication system. A user equipment may be in wireless communication with two or more access nodes at the same time. Communication on the wireless interface between the user equipment and the access node(s) can be based on an appropriate communication protocol. Examples of the various wireless access systems include CDMA (Code Division Multiple Access), WCDMA (Wide-band CDMA), TDMA (Time Division Multiple Access), FDMA (Frequency Division Multiple Access), or SDMA (Space Division Multiple Access), Institute of Electrical and Electronics Engineers (IEEE) 802.11, DECT (Digital Enhanced Cordless Communication), WLAN, WAN or cable connection and further developments and hybrids thereof.

The operation of the network apparatus is controlled by an appropriate control arrangement commonly including a number of various control entities. One or more gateways or intermediate servers may also be provided for connecting a network to other networks or hiding network internal details from external nodes. For example, a PLMN network may be connected to other mobile or fixed line communication networks or data communication networks such as an IP (Internet Protocol) and/or other packet data networks.

A major group of applications carried out by network apparatus in communications systems are the store and forward messaging applications. In store and forward messaging applications data is transmitted from the user equipment to an intermediate storage device, such as a central storage device, stored for a period of time, and then forwarded towards the final recipient or another intermediate storage device. Examples of store and forward messaging applications are electronic mail (e-mail), short messaging service (SMS), multimedia messaging service (MMS) and voicemail (VMX).

There is however a problem associated with conventional store and forward messaging run over an 'open' network. In an open network the data transmitted form the user equipment to the central store and from the central store to the final recipient is typically not encrypted and therefore if any further party is able to intercept the data then the e-mail, text or multimedia message, or voicemail message can be easily understood by using standard tools.

Symmetric and asymmetric key encryption can prevent any intercepted messages from being read. In symmetric key systems the sender (alice) and receiver (bob) have a copy of the same key. The message is encrypted (by alice) using the key before being sent over the open network and then decrypted by the recipient (bob) using the same secret key. However in symmetric key systems there is the general problem of key management: i.e., how can Alice obtain a shared symmetric key to use with Bob if she cannot reach Bob or any other mutual key distribution server. There is also the specific problem of key distribution security, i.e. how can alice or bob ensure that they are the only parties which have access to the key and no one else can decrypt alice's messages to bob.

Asymmetric key encryption uses a key pair. In such systems a user (bob) generates a public key/private key pair. The public key is then received by alice. Alice can then encrypt the message data to bob using bob's public key before transmitting the encrypted data (also known as cipher text). Bob on receiving the encrypted data uses the secret key to regenerate the original message.

Alice can receive the public key from a key distribution server. The key distribution server can also verify to alice that the key belongs to bob and only bob by transmitting a copy of a certificate verifying that the public key belongs to the user it purports to belong to. Keys can be revoked by the user at any time—for example if the user suspects that the secret key has been discovered.

The above solutions therefore rely on alice being able to access the key distribution server whenever she is to transmit a message to bob to retrieve bob's public key if she did not already have it. Further, the solutions also rely on alice being able to access the key distribution server whenever she is to transmit a message to bob to determine if the currently held key is currently valid, otherwise the message may be encrypted using an out of date key or a broken key which can be decrypted by someone other than the recipient.

Seth et al, "Practical Security for Disconnected Nodes", 1st ICNP workshop on Secure Network Protocols, 2005, pages 31 to 36 discusses a hierarchical identity based cryptography (IBC) scheme. In an IBC system a user can construct an encrypted message for a recipient knowing only the identity of the recipient and system parameters. The identity is in the form of a text string, such as a phone number or an e-mail address. Thus if using the same example as discussed above alice wishes to send bob a message, then alice generates a public key using the user id value and some known parameters and encrypts the message without needing to contact the server to determine the public key or if the public key is valid. A private key generator (PKG) generates a private key for bob's identity and is able to forward this key to 'bob'. However Seth et al has the problem that 'bob' may not actually be bob but a user with the identity of bob. The task of verifying the user identity is left to the "kiosk" at which the user enrolls into the system. But the kiosk may not have any reliable or easy way to verify a claimed identity. Also, if the enrolment in the IBC system is based on a claimed identity (such as a phone number), when that identity is revoked, the corresponding enrolment in the IBC system should also be revoked. In Seth et al's solution, neither the PKG nor the enrolling kiosk may have a way to find out if or when the original identity is revoked.

Cao et al, "Providing Secure Services in Peer-to-Peer Communications Networks with Central Security Servers", Telecommunications 2006 International Conference on Internet and Web Applications and Services, page 105, describes a voicemail authentication system using traditional symmetric key cryptography. A user (alice) can construct an encrypted message for another user (bob) participating in the same system. Firstly, alice logs onto the system and creates a shared master session key with the central authentication server. Alice then computes a session key as a function of the master key, a random number, a time stamp, and the recipient's (bob's) user name. Alice then encrypts the message with this session key. Alice also sends the session key and the recipient's (bob's) user name via an encrypted channel to the authentication server. Bob then connects to the system to download the keys required to decrypt the message.

However Cao et al has the drawback that it requires the user to be connected to the system in order to send encrypted messages to other users. Furthermore as also in Seth et al, the recipient (bob's) initial authentication to the authentication server is unspecified and therefore there is no verification that the recipient (bob) should receive the private key from the authentication server.

SUMMARY OF THE INVENTION

Embodiments of the present invention aim to address one or several of the above problems.

There is provided according to a first aspect of the present invention an apparatus comprising a processor, the processor configured to select a first cryptographic key, encrypt a message with the first cryptographic key to produce a first encrypted message, and further encrypt the first cryptographic key and an identifier of a second apparatus with a first encryption key to form a second encrypted message.

The processor is preferably further configured to symmetrically encrypt the message using the first cryptographic key.

The apparatus may further comprise a transceiver configured to transmit the first encrypted message to a node in a communication system.

The node is preferably a store-and-forward node.

The store-and-forward node is preferably at least one of: a short message service centre (SMSC); a multimedia message service centre (MMSC); a electronic mail server; and a voicemail service centre.

The processor is preferably configured to encrypt the first cryptographic key and the identifier of the second entity using an identity based cryptographic (IBC) algorithm, and wherein the first encryption key is preferably a Private Key Generator public key.

The apparatus may further comprise a transceiver configured to transmit the second encrypted message to a node in the communication system.

The node is preferably a store-and-forward node.

The store-and-forward node is preferably at least one of: a short message service centre (SMSC); a multimedia message service centre (MMSC); a electronic mail server; and a voicemail service centre.

The processor is preferably configured to encrypt the first cryptographic key and the identifier of the second entity using a public key cryptographic algorithm, and the first encryption key is preferably a Key generator public key.

The apparatus may further comprise a transceiver configured to transmit the second encrypted message to the Key generator.

The apparatus preferably comprises a user equipment.

The apparatus preferably comprises a first user equipment, and the second apparatus preferably comprises a second user equipment.

According to a second aspect of the invention there is provided an apparatus configured to receive encrypted messages from at least one second apparatus via a communication system, the apparatus comprising: a transceiver configured to receive a first encrypted message and further configured to authenticate the apparatus at a key node to receive a second encrypted message; a processor configured to decrypt the second encrypted message with a first cryptographic key to generate a second cryptographic key and decrypt the first encrypted message with the second cryptographic key to generate a decrypted message.

The transceiver is preferably configured to authenticate the apparatus using a generic authentication architecture (GAA) generic bootstrapping architecture (GBA) procedure.

The transceiver is preferably configured to receive a session cryptographic key configured to encrypt and decrypt data to and from the key node.

The key node is preferably a Private Key Generator server operating identity based cryptographic (IBC) algorithms.

The first cryptographic key is preferably the session key.

The first cryptographic key is preferably the apparatus identity based cryptographic key.

The apparatus may comprise a user equipment.

The apparatus may comprise a user equipment and the second apparatus may comprise a second user equipment.

According to a third aspect of the invention there is provided a node configured to control communications in a communications system, the node comprising: a transceiver configured to receive an authentication request from a first entity and to receive a session cryptographic key; a processor configured to encrypt a first cryptographic key with the session cryptographic key to generate a first encrypted message, wherein the first encrypted message is configured to be transmitted to the first entity by the transceiver.

The node is preferably an identity based cryptographic (IBC) private key generator (PKG), and wherein the node may comprise memory storing the IBC public key, IBC private key and an identifier identifying the first entity.

The processor is preferably configured to generate a first entity IBC secret key dependent on the IBC public key, the IBC private key, and the identifier identifying the first entity.

The first cryptographic key is preferably the IBC first entity secret key.

The node is preferably a key server, and wherein the node may comprise memory storing the key server public key and key server private key.

The transceiver is preferably configured to receive a second encrypted message from a second entity, and the processor is preferably configured to decrypt the second encrypted message from the second entity using the key server private key to recover an identifier identifying the first entity and a further cryptographic key, wherein the first cryptographic key is preferably the further cryptographic key.

According to the fourth aspect of the present invention there is provided a communication system comprising: at least one apparatus as described above; at least one further apparatus as described above; at least one node as described above; and a store-and-forward server.

The store-and-forward server is preferably at least one of: a short message service centre (SMSC); a multimedia message service centre (MMSC); a electronic mail server; and a voicemail service centre.

According to a fifth aspect of the present invention there is provided a method for encrypting and sending a message for a communication system from one entity to a second entity, comprising: selecting a first cryptographic key; encrypting the message with the first cryptographic key to produce a first encrypted message; encrypting the first cryptographic key and an identifier of the second entity with a first encryption key to form a second encrypted message.

The method may further comprise encrypting the message symmetrically.

The method may further comprise transmitting the first encrypted message to a node in the communication system.

The method may further comprise transmitting the first encrypted message to a store-and-forward node.

The store-and-forward node is preferably at least one of: a short message service centre (SMSC); a multimedia message service centre (MMSC); a electronic mail server; and a voicemail service centre.

Encrypting the first cryptographic key and the identifier of the second entity may comprise encrypting using a identity based cryptographic (IBC) algorithm, and wherein the first encryption key is preferably a Private Key Generator public key.

The method may further comprise transmitting the second encrypted message to a node in the communication system.

The node is preferably a store-and-forward node.

The store-and-forward node is preferably at least one of: a short message service centre (SMSC); a multimedia message service centre (MMSC); a electronic mail server; and a voicemail service centre.

Encrypting the first cryptographic key and the identifier of the second entity may comprise encrypting using a public key cryptographic algorithm, and the first encryption key is preferably a Key generator public key.

The method may further comprise transmitting the second encrypted message to the Key generator.

The first entity may comprise a first user equipment.

The first entity may comprise a first user equipment and the second entity may comprise a second user equipment.

According to a sixth aspect of the invention there is provided a method for receiving at a first entity encrypted messages from at least one further entity received via a communication system, comprising: receiving a first encrypted message; authenticating the first entity at a key node; receiving a second encrypted message from the key node; decrypting the second encrypted message with a first cryptographic key to generate a second cryptographic key; and decrypting the first encrypted message with the second cryptographic key to generate a decrypted message.

Authenticating may comprise authenticating the entity using a generic authentication architecture (GAA) generic bootstrapping architecture (GBA) procedure.

The method may further comprise receiving a session cryptographic key configured to encrypt and decrypt data between the key node and the first entity.

The key node may comprise a Private Key Generator server operating an identity based cryptographic (IBC) algorithm.

The first cryptographic key is preferably the session key.

The first cryptographic key is preferably an entity identity based cryptographic key.

The first entity is preferably a user equipment.

The first entity is preferably a user equipment and the further entity is preferably a second user equipment.

According to a seventh aspect of the present invention there is provided a method for controlling communications at a node in a communications system comprising: receiving an authentication request from a first entity; receiving a session cryptographic key; encrypting a first cryptographic key with the session cryptographic key to generate a first encrypted message; and transmitting to the first entity first encrypted message.

The network node is preferably an identity based cryptographic (IBC) private key generator (PKG), and wherein the node may comprise memory storing the IBC public key, IBC private key and an identifier identifying the first entity.

The method may comprise generating a IBC secret key of the first entity dependent on the IBC public key, the IBC private key, and the identifier identifying the first entity.

The first cryptographic key is preferably the IBC first entity secret key.

The network node is preferably a key server, and wherein the node may comprise memory storing the key server public key and key server private key.

The method may further comprise: receiving a second encrypted message from a second entity; decrypting the second encrypted message using the key server private key to recover an identifier identifying the first entity and a further cryptographic key, and wherein encrypting a first cryptographic key with the session cryptographic key comprises encrypting the further cryptographic key with the session cryptographic key.

According to an eighth aspect of the present invention there is provided an entity for encrypting and sending a message for a communication system to a second entity, the entity comprising: means for selecting a first cryptographic key, means for encrypting the message with the first cryptographic key to produce a first encrypted message, and further encrypting the first cryptographic key and an identifier of the second entity with a first encryption key to form a second encrypted message.

According to a ninth aspect of the present invention there is provided an entity configured to receive encrypted messages from at least one second entity via a communication system, the entity comprising: means for receiving a first encrypted message; means for authenticating the entity at a key node; means for receiving a second encrypted message; means for decrypting the second encrypted message with a first cryptographic key to generate a second cryptographic key; and means for decrypting the first encrypted message with the second cryptographic key to generate a decrypted message.

According to a tenth aspect of the present invention there is provided a node comprising: means for receiving an authentication request from a first entity; means for receiving a session cryptographic key; means for encrypting a first cryptographic key with the session cryptographic key to generate a first encrypted message; and means for transmitting the first encrypted message to the first entity.

According to an eleventh aspect of the present invention there is provided a computer program product embodied on a computer-readable medium, the computer program product configured to provide a method for controlling a first entity configured to encrypt and send a message via a communication system to a second entity, the method comprising: selecting a first cryptographic key; encrypting the message with the first cryptographic key to produce a first encrypted message; encrypting the first cryptographic key and an identifier of the second entity with a first encryption key to form a second encrypted message.

According to a twelfth aspect of the invention there is provided a computer program embodied on a computer-readable medium, the computer program product configured to perform a method for controlling a first entity configured to receive encrypted messages from at least one further entity via a communication system, the method comprising: receiving a first encrypted message; authenticating the first entity at a key node; receiving a second encrypted message from the key node; decrypting the second encrypted message with a first cryptographic key for generating a second cryptographic key; and decrypting the first encrypted message with the second cryptographic key for generating a decrypted message.

According to a thirteenth aspect of the present invention there is provided a computer program product embodied on a computer-readable medium, the computer program product configured to perform a method for controlling a communications node in a communications system comprising: receiving an authentication request from a first entity; receiving a session cryptographic key; encrypting a first cryptographic key with the session cryptographic key for generating a first encrypted message; and transmitting to the first entity the first encrypted message.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Some exemplifying and non-limiting embodiments of the invention are discussed below with reference to a mobile communication network such as a public landline mobile network (PLMN). Before explaining these in more detail, a communication system comprising at least a PLMN is briefly explained with reference to FIG. 1.

Figure 1:
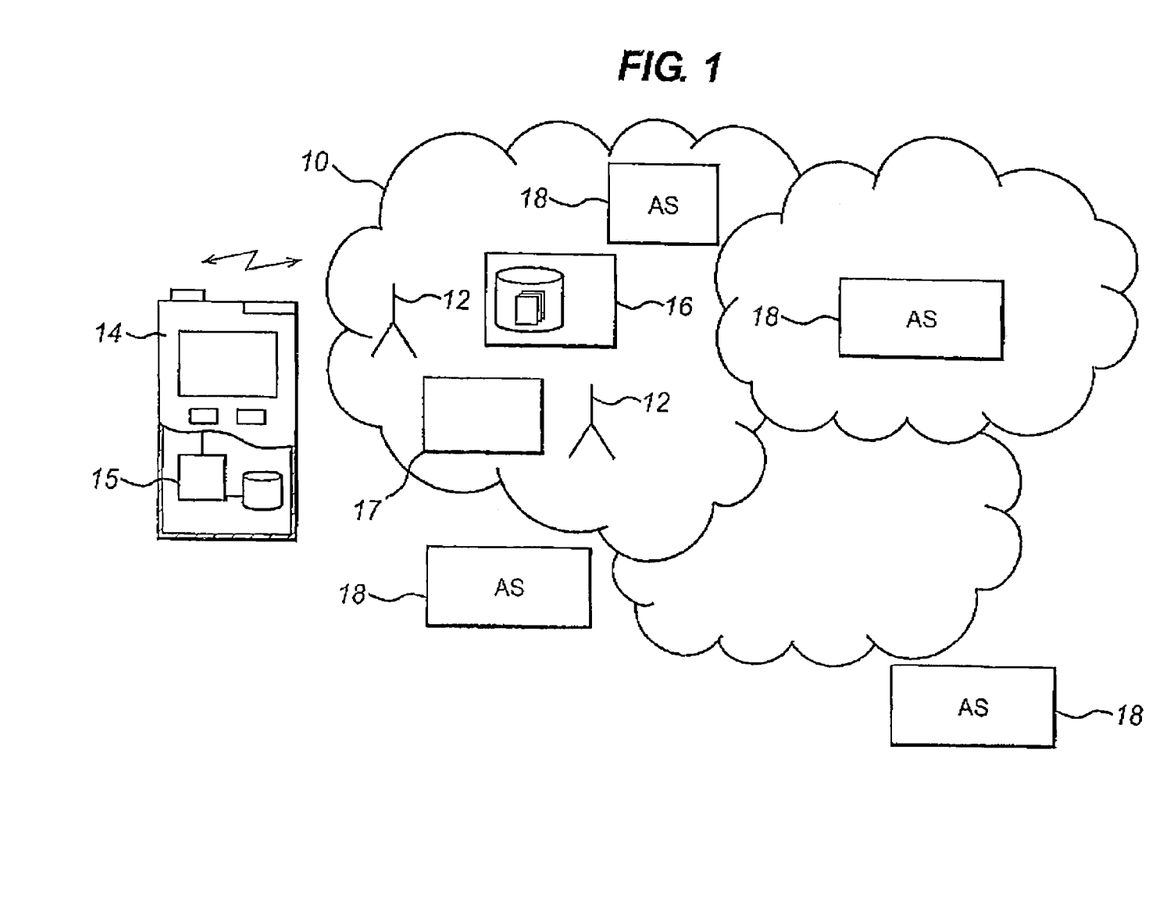
FIG. 1 shows a schematic view of an example communications system within which the present invention may be embodied.

In a PLMN 10 a number of base stations 12 are arranged to wirelessly transmit signals to and receive signals from a plurality of mobile user equipment 14 (of which one is shown in FIG. 1). Likewise, mobile user equipment 14 is able to transmit wireless signals to and receive signals from base stations 12. The operation of the network 10 is typically controlled by means of appropriate controller entities. Data required for the operation of the PLMN is typically stored in appropriate data storage entities and servers.

FIG. 1 shows a data storage 16 configured to store data relating to the authenticity of the user. This data storage is also known as a credential server. The credential server is arranged to store data known as a secret credential or shared secret, which is selected or generated and known only to the credential server and the user. A credential can be a cryptographic key, a password or another form of security token.

The user equipment (UE) 14 can be provided by any appropriate user terminal.

The user equipment may contain or have access to one or more secure environments. In a mobile communications system, the user equipment constitutes a mobile terminal, for example a mobile telephone, a personal digital assistant (PDA) or a mobile PC (personal computer), or the like.

For use in a wireless communications system, the user equipment 14 may comprise receive and transmit circuitry and means for receiving and transmitting wireless signals for implementing calls and other signalling channels so that it is enabled to communicate with the base stations 12, for example to make voice call and to send and receive data. The user may also connect his device directly to a cable based network and therefore access services that reside in the wireless communication system via the IP protocol. The user equipment may also be enabled to process control instructions it may receive from the network and to send control information to the network.

A user may access various applications, for example service applications via the network he or she has access to. An application may be provided by a provider entity, for example any of service provider application servers 18. It is noted that the application servers (AS) need only be connected to the mobile network, but are not necessarily a part of the mobile network. The application server may be some kind of broadcasting server. This means that the operator of the network 10 may not necessarily have any or may only have a limited control on the operation of an application provider. Furthermore, a communication system may be provided by a plurality of different communication networks. Thus the application provider entity may be connected to another network than the network the user subscribes to. Also the network where a user has subscribed to may consist out of several network types, for example, UMTS, fixed line, WLAN or similar all run by the same operator.

A user or the user equipment commonly needs to be authenticated before he/she is allowed to access or otherwise use various applications and services via the network. FIG. 1 shows a security management server 17 adapted for user authentication. The security management server is capable of key generation. For example, the server 17 provides a bootstrapping function based on secret credential values stored in the credential database that may be part of the security management server or connected to it.

A user can be identified by the security management server 17 based on various credentials. Non-limiting examples of user credentials include International Mobile Subscriber Identity (IMSI) and Internet Protocol Multimedia Private Identity (IMPI). Non-limiting examples of public credentials include Mobile Subscriber Integrated System Digital Number (MSISDN), calling line identifier (CLF) and IP Multimedia Public Identity (IMPU).

To maintain the identity information user equipment 14 may be provided with a memory 15 arranged to store secure credentials that enable the networks to ensure that the user is who they claim to be. The memory may contain a number of security and other applications. A user may have several kinds of user identities, session credentials and service identifiers that are stored in the memory. The memory 15 in embodiments of the invention stores the shared secrets (with the subscriber data storage) and stores security keys generated from the shared secret. The generated shared secret may also be stored in a secondary memory that is connected to the primary memory that holds the shared secrets with the subscriber data storage. The secret credential values (shared keys with the subscriber data storage) may then be used in creation and receiving of trusted connections between the user equipment and an application, such as broadcasting content protection.

Figure 2:
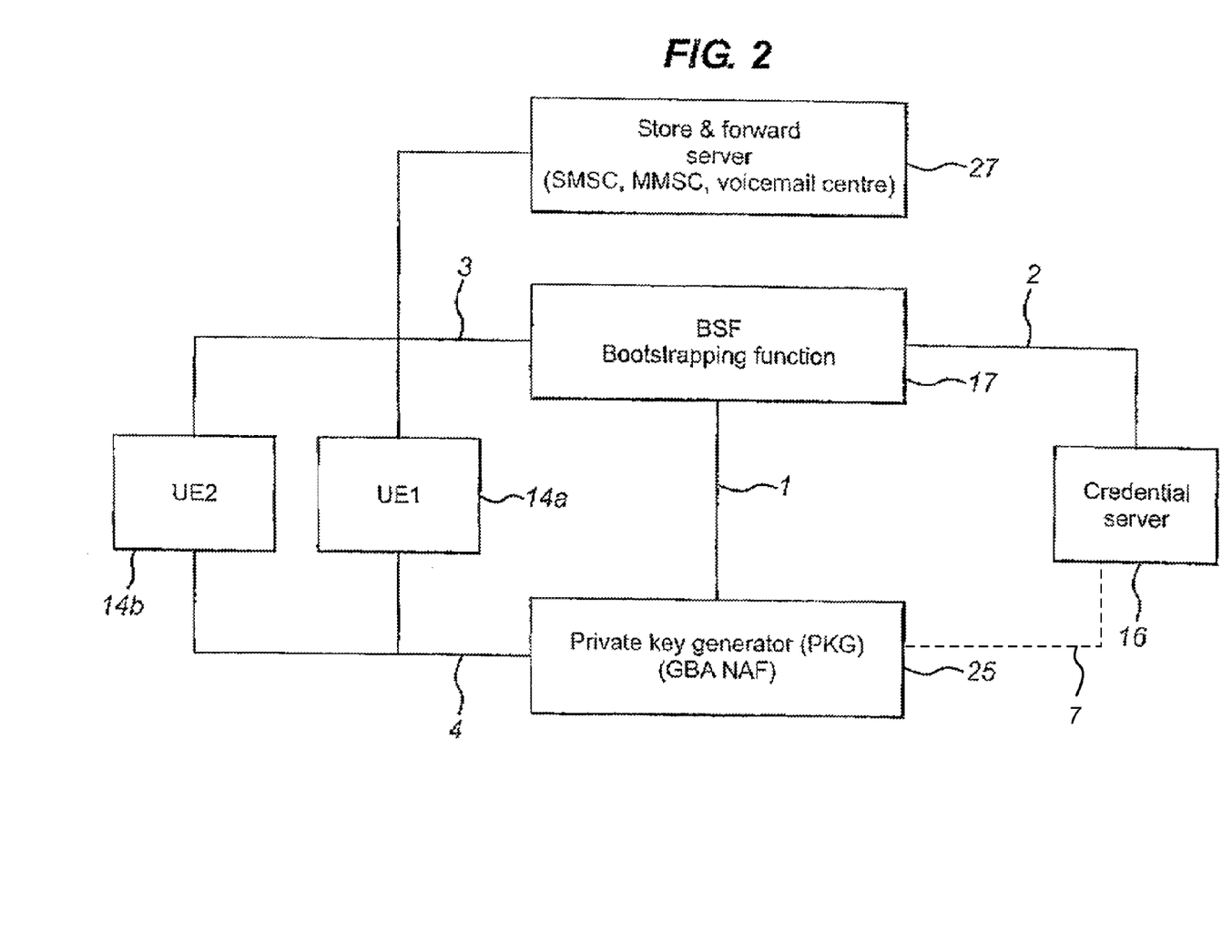
FIG. 2 shows a schematic view a first embodiment of the present invention communications architecture.

FIG. 2 shows a schematic view of the communications system server architecture of a first embodiment of the invention.

The architecture comprises user equipment 14. A first user equipment 14*a* and a second user equipment 14*b* are shown. In order to assist the understanding of the present invention the below examples feature a user 'Alice' operating the first user equipment 14*a* and a second user 'Bob' operating the second user equipment 14*b*. The user equipment 14 may communicate to a private key generator (PKG) server 25 over an appropriate interface 4, for example an Ua interface. The PKG server 25 is an example of the application server shown in FIG. 1. The user equipment (UE) 14 can also communicate to a security management server (bootstrapping function (BSF) server) 17 via an appropriate interface 3, for example an Ub interface.

The security management server (the BSF server) 17 may also communicate with the network application function (the PKG server) 25 over an appropriate interface 1, for example a Zn interface. The security management server (BSF server) 17 further may communicate with the data storage 16 configured to store subscriber information (which in a first embodiment of the invention is a credential server) via the interface 2, for example a Zh interface. The BSF may also contain itself the security data storage e.g. in form of an AAA server functionality of extended DNS server functionality.

The Network Application Function (NAF) server 25 may in further embodiments of the invention be connected directly to the data storage 16 configured to store subscriber information over an appropriate interface 7 (represented in FIG. 2 as a dashed line), for example a Sh or Zh interface.

The user equipment 14*a* and 14*b* are further connected via an appropriate interface to a store-and-forward server. In the example shown in FIG. 2 the store-and-forward server is a short message service centre (SMSC) 27 which is arranged to receive, store and then forward short message service messages, also known as text messages. However it would be appreciated by the person skilled in the art that the below described methods could be used in any store-and-forward communication scheme. Thus in other embodiments where the store-and-forward communication scheme is e-mail based, the store-and-forward server may be a e-mail server. In further embodiments where the store-and-forward communication scheme is multimedia message service (MMS) message based, the store-and-forward server may be multimedia message service centre (MMSC). In other embodiments where the store-and-forward communication scheme is voicemail based, the store-and-forward server may be a voicemail centre.

Figure 3:
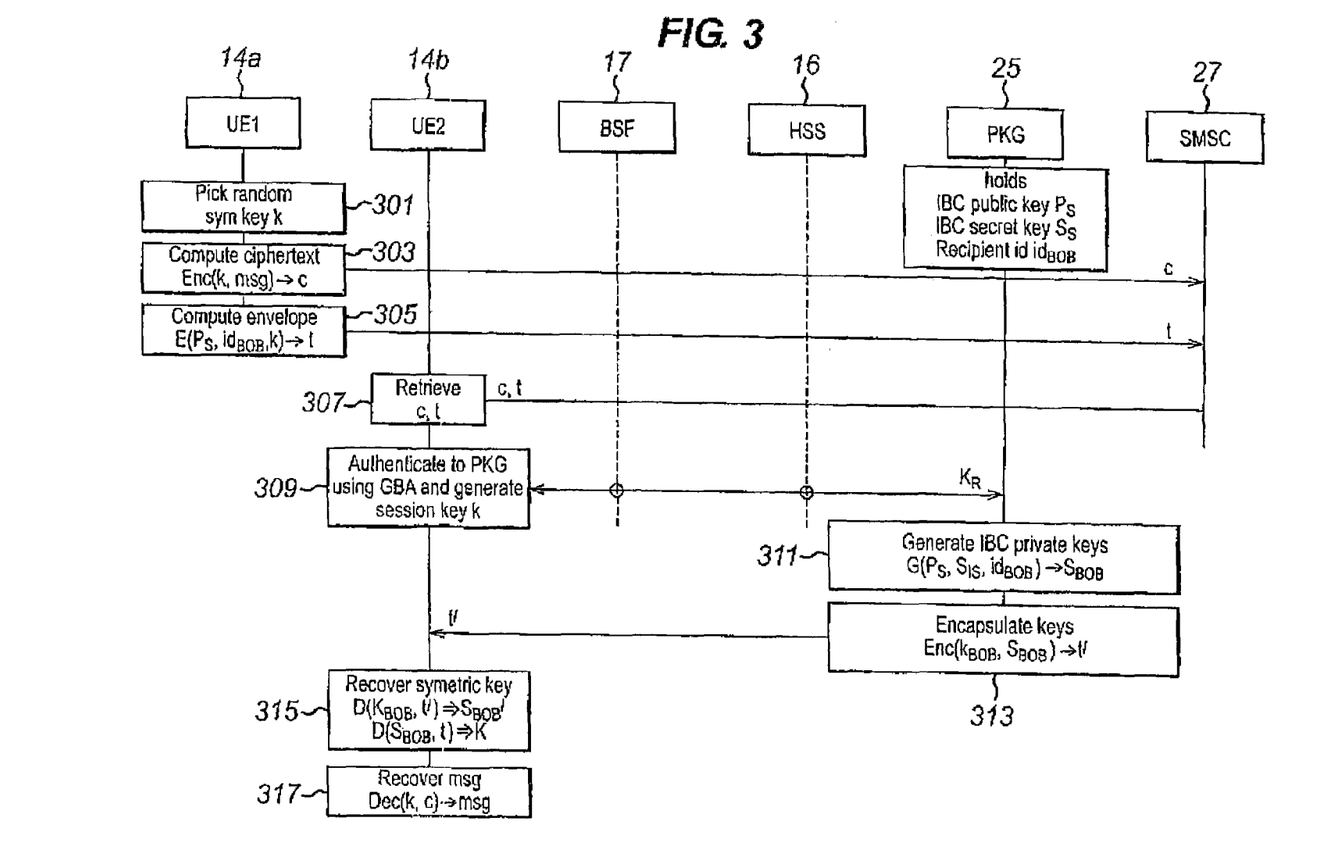
FIG. 3 shows a flowchart describing the operation of the first embodiment of the present invention.

With respect to FIGS. 2 and 3, the operation of a first embodiment of the invention is described in further detail. In the first embodiment an identity based cryptography (IBC) system is used. An Identity based cryptographic (IBC) scheme is similar to an asymmetric key exchange scheme. So to more easily understand the operation of the present invention with respect to an IBC system as featured in the first embodiment of the invention we will briefly describe an IBC scheme where Alice sends a message to Bob.

In a manner similar to other asymmetric key schemes it comprises algorithms which use public input transformations, which are similar to public key encryption or signature verification operations, and private input transformations, which use the corresponding private key operations.

An IBC scheme is defined with respect to a name space which comprises a range of public identities. Each public identity string in the name space corresponds to a unique private key. An instance within IBC is therefore defined by a common public key system parameter.

Public transformations within an IBC scheme require or take the parameters relating to the communications system, the identity string of the recipient, and the input data to be encrypted as input parameters. Unlike the traditional asymmetric key scheme, there is no public key corresponding to each private key. The role of the public key is replaced by the use of the public identity string of the user being addressed.

Private key transformations within an IBC scheme require or take the system parameters, the private key and the encrypted data as input parameters.

The private key generator (PKG) of the IBC is a trusted entity which is able to generate and distribute private keys. The private key generator has a master secret key which also partly determines the public system parameters. For each identity in the name space, the private key generator generates the corresponding private key and securely transfers the key to the user that has the right to claim that identity. For example, using the above examples where Alice sends a message to Bob, the following steps are taken:

1. The private key generator (PKG) uses the known master key S and generates and publishes the public system parameters P. Alice obtains the public system parameters P and Bob's identity ($ID_{Bob}$) in a trustworthy manner.

2. Alice takes the message M and applies the public transformation E( )—where E( ) represents the IBC cryptographic transform to obtain the encrypted message, also known as cipher text, C:

$E(P, ID_{Bob}, M) \Rightarrow C$.

3. Alice sends C to Bob. As the message is encrypted the message, even if intercepted by a third party is not readable.

4. If Bob already has his secret key he uses the key to decrypt the message as described below in step 5. If Bob does not have the private key $K_{Bob}$, then:

Bob sends a key request to the private key generator (PKG);

The private key generator (PKG) authenticates Bob by some external means;

The PKG further generates Bob's private key by applying a key generation function Go with inputs from the master secret S, and Bob's identity string $ID_{Bob}$, $G(S, ID_{Bob}) \Rightarrow K_{Bob}$;

The private key generator then sends $K_{bob}$ to Bob via an authenticated and confidential channel.

5. Bob extracts M by applying the private key transformation Do with the private key $K_{Bob}$, and the received cipher text C as the input:

$D(P, K_{Bob}, C) \Rightarrow M$.

IBC schemes by themselves however currently have the problem as described earlier. Currently the process of validating at the PKG whether the recipient 'Bob' is actually 'Bob' is capable of being exploited. Furthermore the problem of removing or revoking 'Bob' from the IBC system is equally problematic. FIG. 3 shows how embodiments of the invention implementing a modified IBC system can at least partially overcome the problems associated with the prior art.

As has been previously described, in order to assist the understanding of the invention a message will be sent from Alice operating the first user equipment UE1 14*a* to Bob operating the second user equipment UE2 14*b*. However it would be understood by the person skilled in the art that these are non limiting examples and that the message could be sent from UE2 to UE1, and furthermore the generation, transmission and reception of the messages may be under control of automatic control rather than users 'Alice' and 'Bob'. The examples as described in the first and second embodiments of the invention describe the example where the message is a short message service (SMS) message, otherwise known as a text message.

In step 301, Alice operating the first user equipment UE1 14A selects a random symmetrical key K.

In step 303, after Alice has selected the text message (msg) to be sent, the first user equipment computes the cipher text (C) using symmetric key encryption, Enc(K, msg) ⇒ C, where Enc(a,b) ⇒ c defines symmetric key encryption where b is encrypted using the key a to generate the output c. The cipher text C of the text message is then transmitted to the SMSC 27, in other words the store and forward server.

In step 305, the first user equipment 14*a* uses the IBC system parameter $P_S$ and Bob's identity string $ID_{Bob}$ to asymmetrically encrypt the symmetric key K in envelope t, $E(P_S, ID_{Bob}, K) \Rightarrow t$, where E(a,b,c) ⇒ d defines asymmetric key encryption where c is encrypted by the public key and using the parameters provided by b to generate the output d.

The envelope t is then also transmitted to the SMSC 27. Thus the user equipment has now transmitted both the cipher text C and the envelope t to the SMSC 27.

In step 307 the second user equipment 14*b* (in other words the user equipment operated by Bob, the final recipient of the message), retrieves the cipher text C and the envelope t from the SMSC 27.

In step 309, Bob operating the second user equipment 14*b* authenticates the second user equipment 14*b* with the private key generator using the method known as generic bootstrapping operating in a generic bootstrapping architecture (GBA).

Bootstrapping is described in further detail for example in 3rd Generation Partnership Project (3GPP); Technical Specification Group Services and System Aspects; Generic Authentication Architecture (GAA); Generic bootstrapping architecture document TS33.320. However in principle the generic bootstrapping architecture (GBA) enables any user equipment to authenticate or register themselves at a network application function, a server carrying out an application within the network. The process may exchange data with a bootstrapping server function (BSF) 17 and the credential server such as a home service server (HSS) 16.

In bootstrapping the user equipment first attempts to register at the network application function. If the user equipment does not have a current valid registration then the user has to communicate with a bootstrapping function server after communicating with the credential server to determine if the user is validly allowed to communicate with the network application function provides the user with sufficient information to register at the network application function.

When the user equipment then attempts to authenticate themselves at the network application function with the bootstrapped information the network application function uses this information to check with the bootstrapping function whether the user can access the service and if so the network application function returns a message permitting the user to use the service.

One of the steps of bootstrapping is the generation of a session key KR which a symmetric key shared between the user and the network application function. The PKG is one example of a network application function. Therefore in step 309, when the second user equipment 14*b* authenticates Bob with the Private Key Generator (PKG) 25, the session key $K_{Bob}$ is shared between the second user equipment 14*b* and the PKG 25.

In some embodiments of the invention the second user equipment 14*b* carries out the authentication step 309 at substantially the same time as carrying out the retrieval step of step 307. In other embodiments of the invention, the steps 307 and 309 are carried out sequentially.

In step 311, the PKG 25 generates all of the IBC private keys since the last retrieval. Bob may require several private keys. Each of Bob's private keys may correspond to some 'expansion' of Bob's identity. For example if Bob's identity is represented by the string "Bob", the expansions may be a separate string concatenated with the string. For example the expansion may be a date concatenated with the string, "Bob|1-11-2007", or an indicator of the age group of the user "Bob|over-21". These identity expansions each may have a separate public key, and thus the public key may be different in different private key retrieval attempts. Therefore the PKG may need to compute new private keys since Bob's last access.

Thus the keys for Bob (The IBC equivalent to the asymmetric secret key) $S_{Bob}$ are generated by the PKG using key generation function G( ) with inputs of the PKG system parameters $P_s$, PKG secret (or master) key $S_S$ and recipient ID—in this example $ID_{Bob}$, $G(P_S, S_S, ID_{Bob}) \Rightarrow S_{Bob}$.

In step 313, the PKG 25 encapsulates Bob's secret key $S_{Bob}$ in an envelope t' in order that it can be transmitted to Bob. This encapsulation encrypts the secret key $S_{Bob}$ using the symmetric session key $K_{Bob}$ generated during the authentication process, $Enc(K_{Bob}, S_{Bob}) \Rightarrow t'$.

In some embodiments of the invention the IBC PKG secret key $S_{Bob}$ may include the system parameters.

The private key generator 25 then transmits the encapsulated key envelope t' to Bob at the second user equipment 14*b*. Note that in this embodiment the number of private keys downloaded by Bob is independent of the number of messages which are sent to Bob.

In step 315, the second user equipment 14*b* recovers the symmetric key K which was used to encrypt the original message. This is done by first decrypting the encapsulated key t' with the key $K_{Bob}$ shared by Bob and the PKG, $D(K_{Bob}, t') \Rightarrow S_{Bob}$, to recover Bob's secret key generated by the PKG 26. Then using this recovered key to decrypt the envelope t received directly from Alice to recover the session key $D(S_{Bob}, t) \Rightarrow K$, Where D(a,b) ⇒ c defines the asymmetric decryption process where b is decrypted using the private key a to generate the output c.

In step 317, the original message, msg, is recovered by the symmetrical decryption of the cipher text, C, with the recovered symmetrical key K, Dec(K,C) ⇒ Msg, where Dec(a,b) ⇒ c defines a symmetrical decryption process using the key a on cipher text b to produce the output c.

The original random symmetric key k, may be considered to be a session key used to encrypt only one message. Thus there is no requirement to invalidate or revoke k as may be considered to be invalid as soon as a message has been received. In one embodiment the identity string is the International Mobile Subscriber Identity (IMSI). However it would be appreciated by the person skilled in the art that other credential values or combination or selection of credential values can be used as identity values. Non-limiting examples of user credentials that may be used to generate these identities include Internet Protocol Multimedia Private Identity (IMPI). Mobile Subscriber Integrated System Digital Number (MSISDN), calling line identifier (CLF) and IP Multimedia Public Identity (IMPU).

Furthermore embodiments such as those described above do not require Alice to connect to the network before creating the message. Therefore in environments where there is only sporadic or where periods of connection can not be predicted—for example in remote rural areas where passing vehicles can operate a temporary store and forward servers Alice can generate a text message to Bob transmit it to a passing vehicle, which when it comes into a normal network range then passes the message to Bob without requiring Alice to first connect to the network to determine a current encryption key for Bob.

Figure 4:
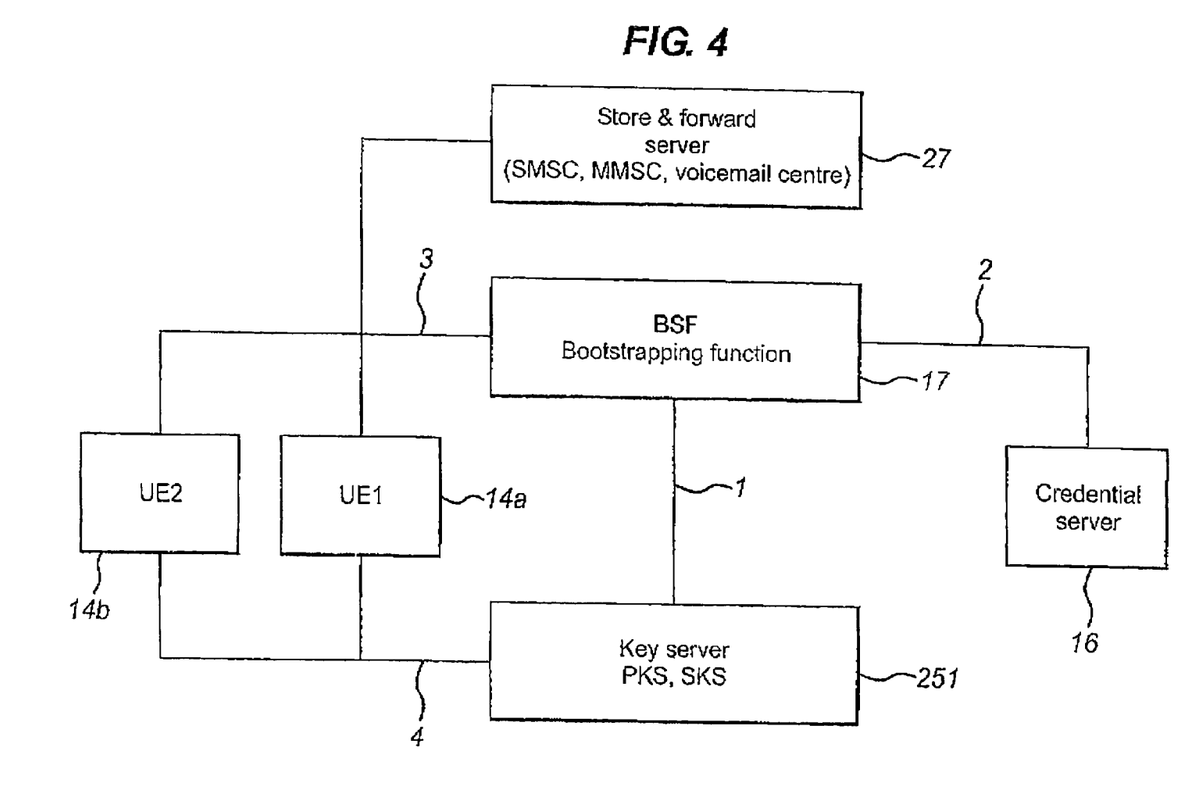
FIG. 4 shows a schematic view of a second embodiment of the present invention communications architecture.

With respect to FIG. 4 a second architecture within which a second embodiment of the invention can be operated is shown. The architecture shown in FIG. 4 differs from the architecture in FIG. 2 in that the private key generator (PKG) providing private keys to the recipient is replaced by a key server 251 with which all users have established pairwise shared keys. The Key server 251 furthermore stores a copy of the Key server's public key $PK_{KS}$, together with the Key server's private or secret key $SK_{KS}$. All potential message senders have obtained a trusted copy of $PK_{KS}$.

Figure 5:
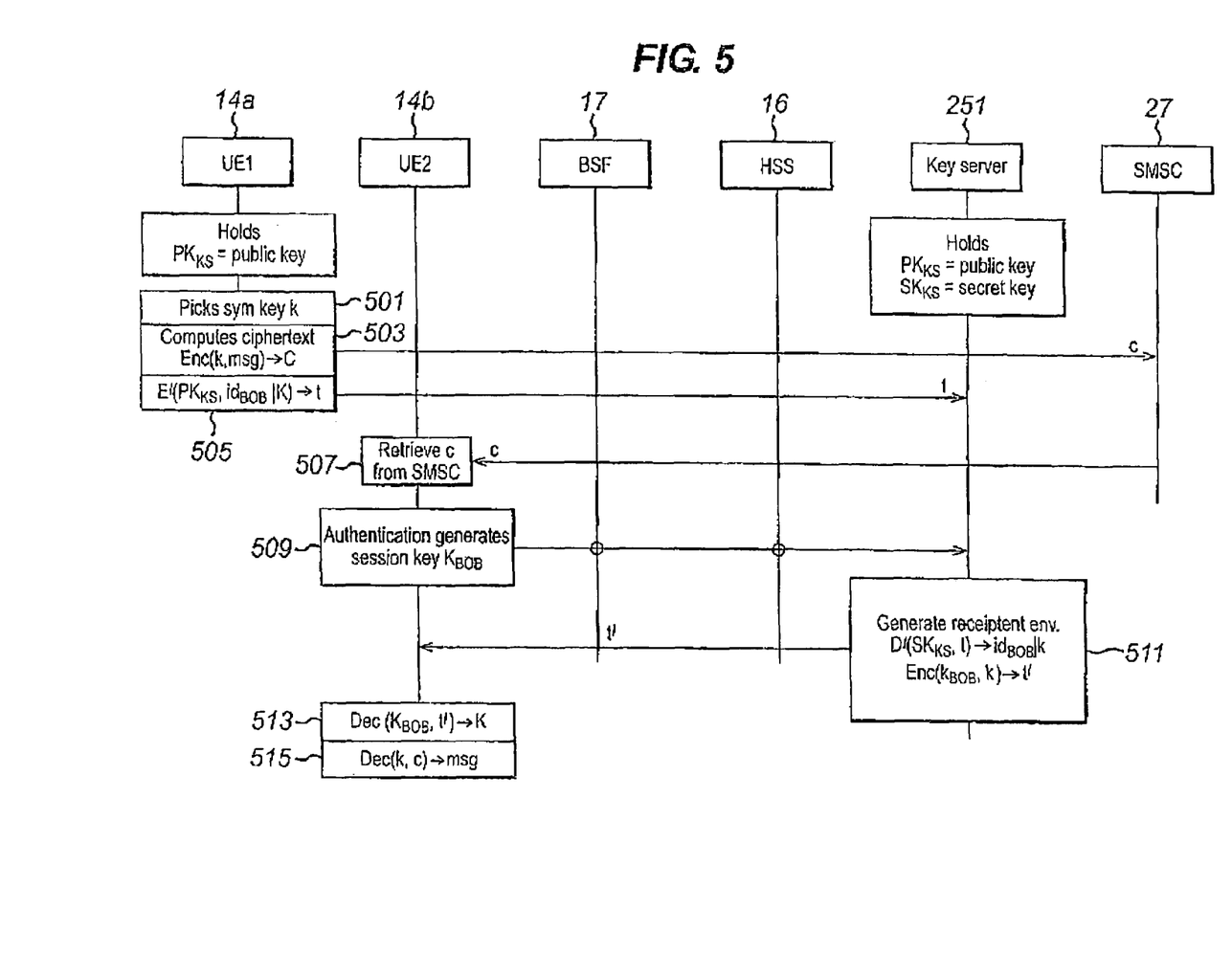
FIG. 5 shows a flowchart describing the operation of a second embodiment of the present invention.

With respect to FIG. 5 an example of the operation of the second embodiment of the invention, as operated over the architecture shown in FIG. 4, is described in further detail. In the example of the operation Alice is again sending a text message to Bob. However it would be appreciated by the person skilled in the art that the methods described could be used in any store-and-forward communication scheme. Thus the store-and-forward communication scheme could be any of the non-limiting list of e-mail, multimedia message service (MMS) messages, or voicemail.

In the following example Alice has provisionally downloaded the Key server's public key $PK_{KS}$ and Bob's identity $ID_{Bob}$, but not Bob's public key $PK_{Bob}$.

In step 501, the Alice operating the first user equipment 14a selects a symmetrical key K.

In step 503, Alice generates the text message msg and the first user equipment 14a computes the cipher text using the symmetrical key K and the message, Enc (K, Msg) $\Rightarrow$ C.

The cipher text C is then transmitted to the SMSC 27. As would be understood by the person skilled in the art this represents an example of the store-and-forward servers which may be employed in embodiments of the invention.

In step 505, an envelope t is generated from the public key of the key server $PK_{KS}$ and using the ID of the recipient, Bob's ID $ID_{Bob}$, and the symmetrical key used to encrypt the message K, E'($PK_{KS}$, $ID_{Bob}$|K) $\Rightarrow$ t, where E'(a,b|c) $\Rightarrow$ d defines conventional public key encryption where a the public key a encrypts b and c. The envelope t is transmitted to the key server 251.

In step 507, the final recipient, Bob, at the second user equipment 14b retrieves the cipher text from the SMSC 27.

In step 509, Bob at the second user equipment 14b also authenticates himself to the key server 251 (with the key server behaving as a network application function) using a generic boot strapping algorithm (GBA). As discussed with regards to the first embodiment the process of authentication generates and distributes to the Key server 251 and the second user equipment 14b a session key $K_{Bob}$.

In step 511, after authentication, the key server 251 generates the recipient envelope t' containing the information required to decrypt the cipher text. Firstly the key server 251 decrypts the received envelope t using the Key server secret key $SK_{KS}$ to generate Bob's ID $ID_{Bob}$ concatenated with the selected symmetrical key K, D'($SK_{KS}$, t) $\Rightarrow$ $ID_{Bob}$|K, where D'(a,b) $\Rightarrow$ c defines a private key decryption of the encrypted value b with the private or secret key a to produce the output c.

Secondly the key server 251 encrypts the symmetrical key K with the session key $K_{Bob}$, Enc($K_{Bob}$, K) $\Rightarrow$ t'.

The envelope t' is then transmitted to the second user equipment 14b.

In step 513 the second user equipment 14b, recovers the symmetrical key K by decrypting the envelope t' with the session key $K_{Bob}$, Dec ($K_{Bob}$, t') $\Rightarrow$ K.

In step 515 the second user equipment recovers the message msg by decrypting the cipher text C using the symmetrical key K, Dec (K, C) $\Rightarrow$ msg.

This second embodiment has the same advantages as described above in that the sender of the message can generate and send the message to the recipient without needing to contact the recipient or a third party to determine whether the recipient has a valid key or if the key held by the sender is the current valid key.

Furthermore, tables 1 and 2 show the number of operations required to where there are n senders and m recipients.

TABLE 1

| Multiple senders (n) | IBC-based (first embodiment) | PKC-based (second embodiment) |
|---|---|---|
| # of decryptions by recipient | n (IBC) + 2n (symmetric) | 2n (symmetric) |
| # of operations by server | 1 (IBC key generation) | m (PKC decryptions) + m (symmetric encryptions) |

Table 1 shows the number of operations required to be carried out by the key server/PKG and the receiver (user equipment) in the two embodiments.

In the first embodiment described with reference to FIGS. 2 and 3.

The recipient (user equipment) is required to carry out n (IBC) decryption operations and 2n symmetric decryption operations.

The PKG is required to carry out 1 IBC key generation operation.

In the second embodiment described with reference to FIGS. 4 and 5.

The recipient (user equipment) is required to carry out 2n symmetric decryption operations.

For both embodiments the 2n symmetric decryption operations comprise n operations to decrypt t and n operations to decrypt C.

The key server is required to carry out m PK C decryption operations and m symmetric encryption operations. In some embodiments the key server sends all of the message keys to the recipient in single symmetric encryptions. Such a system requires that the m decryptions are only carried out when the recipient requests message keys.

TABLE 2

| Multiple recipients (m) | IBC-based (first embodiment) | PKC-based (second embodiment) |
|---|---|---|
| # of encryptions by sender | m (IBC) + 1 (symmetric) | 1 (PKC) + 1 (symmetric) |
| # of operations by server | 1 (IBC key generation) | 1 (PKC decryptions) + m (symmetric encryptions) |

Table 2 shows the number of operations required to be carried out by the key server/PKG and the sender (user equipment) in the two embodiments.

In the first embodiment described with reference to FIGS. 2 and 3.

The sender (user equipment) is required to carry out m (IBC) encryption operations and 1 symmetric encryption operation.

The PKG is required to carry out 1 IBC key generation operation.

In the second embodiment described with reference to FIGS. 4 and 5.

The sender (user equipment) is required to carry out 1 PKC encryption and 1 symmetric encryption operation.

The key server is required to carry out 1 PK C decryption operation and m symmetric encryption operations.

As can be seen the IBC based solution (the first embodiment of the invention) therefore imposes less load on the PKG server. More importantly the load is proportional to the number of users in the system. This differs from the PKC based solution (the second embodiment of the invention) where the load is proportional to the total number of messages. The IBC based solution imposes a greater load on the senders/recipients since they have to perform public key operations proportional to the number of messages. Performing one public key operation per message is however typical and not an undue burden except in situations where the user equipment is extremely constraint with regards to resources.

Such system as described above is therefore advantageous as any revocation action is easy when the same is reflected the participation in the system is automatically revoked. Furthermore, in some embodiments of the invention short-lived certificates can be used to avoid revocation checking. These would be GAA subscriber certificates.

The above described operations may require data processing in the various entities. The data processing may be provided by means of one or more data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a location server.

In some embodiments of the present invention the BSF and credential server functionality is housed within a single server entity.

It is noted that whilst in the above embodiments are described in relation to user equipment such as mobile stations, embodiments of the present invention are applicable to any other suitable type of user equipment.

Furthermore although we have described the user equipment connecting to a network application function over a Ub interface, same or similar secret credential and associated public or semi-public credential values could communicate over various communication interfaces. For example embodiments incorporating the GBA-PW embodiment as described above could be used for authentication on application function over normal HTTP Digest connections. Furthermore embodiments incorporating the GBA-PKI embodiments can be used for authentication and security over TLS handshake interfaces. In the transport layer for security (TLS) handshake embodiments the lifetime and B-TID values can be sent as one of the parameters in the TLS handshake as outlined by 3GPP TS33.222. Furthermore the secret credential in this embodiment (Ks) can be the agreed TLS master key. This master key could be used for any kind of service, independent on the device platform used.

It is also noted that even though the exemplifying communication system shown and described in more detail in this disclosure uses the terminology of the 3rd generation (3G) WCDMA (Wideband Code Division Multiple Access) networks, such as UMTS (Universal Mobile Telecommunications System) or CDMA2000 public land mobile networks (PLMN), embodiments of the proposed solution can be used in any communication system wherein advantage may be obtained by means of the embodiments of the invention. The invention is not limited to environments such as cellular mobile or WLAN systems either. The invention could be for example implemented as part of the network of computers known as the "Internet", and/or as an "Intranet". Furthermore the user equipment 14 in some embodiments of the present invention can communicate with the network via a fixed connection, such as a digital subscriber line (DSL) (either asynchronous or synchronous) or public switched telephone network (PSTN) line via a suitable gateway.

In the above embodiments, the message is passed from a first user equipment to a second user equipment. However it would be understood by the person skilled in the art that the messages may be sent from a first network entity to a second network entity. For example the recipient may not be a user equipment but a network server for registering an opinion or a vote. In such a way the user operating the user equipment can be secure that the opinion or vote submitted is not read by a third party. Furthermore the sender of the message may not be a user equipment but a network entity for transmitting messages to user equipment or other network entities.

It is also noted that while the above describes exemplifying embodiments of the invention, there are several variations and modifications which may be made to the disclosed solution without departing from the scope of the present invention as defined in the appended claims.

The invention claimed is:

1. An apparatus comprising:
a processor, the processor configured to:
select a first cryptographic key, where the first cryptographic key is a symmetric cryptographic key;
encrypt a message to be sent to a second apparatus with the first cryptographic key to produce a first encrypted message; and
encrypt the first cryptographic key and an identifier of the second apparatus with a first encryption key to form a second encrypted message, where the first encryption key is an asymmetric encryption key; and
a wireless transceiver, the wireless transceiver configured to:
transmit the first encrypted message and the second encrypted message to the second apparatus via a store-and-forward node of a wireless communication system.

2. The apparatus as claimed in claim 1, wherein the message is a text message, and wherein the identifier of the second apparatus is comprised of at least one of an International Mobile Subscriber Identity (IMSI), an Internet Protocol Multimedia Private Identity (IMPI), a Mobile Subscriber Integrated System Digital Number (MSISDN), a calling line identifier (CLF) and an IP Multimedia Public Identity (IMPU).

3. The apparatus as claimed in claim 1, wherein the store-and-forward node is at least one of:
 a short message service centre (SMSC);
 multimedia message service centre (MMSC);
 a electronic mail server; and
 a voicemail service centre.

4. The apparatus as claimed in claim 1, wherein the processor is configured to encrypt the first cryptographic key and the identifier of the second apparatus using an identity based cryptographic (IBC) algorithm, and wherein the first encryption key is a Private Key Generator public key.

5. An apparatus comprising:
 a processor, the processor configured to:
 select a first cryptographic key, where the first cryptographic key is a symmetric cryptographic key;
 encrypt a message to be sent to a second apparatus with the first cryptographic key to produce a first encrypted message; and
 encrypt the first cryptographic key and an identifier of the second apparatus with a first encryption key to form a second encrypted message, where the first encryption key is an assymetric encryption key; and
 a wireless transceiver, the wireless receiver configured to:
 transmit the first encrypted message to the second apparatus via a store-and-forward node of a wireless communication system;
 wherein the processor is configured to encrypt the first cryptographic key and the identifier of the second apparatus using a public key cryptographic algorithm, and the first encryption key is a Key generator public key, wherein the wireless transceiver is further configured to transmit the second encrypted message to the Key generator.

6. The apparatus as claimed in claim 1, wherein the apparatus comprises a user equipment configured for use with a cellular communication system.

7. The apparatus as claimed in claim 1, wherein the apparatus comprises a first user equipment, and the second apparatus comprises a second user equipment, where both the first user equipment and the second user equipment are configured for use with a cellular communication system.

8. A node comprising:
 a transceiver configured to receive an authentication request from a first entity via a wireless communication system and to receive a session cryptographic key, where the session cryptographic key is an asymmetric cryptographic key; and
 a processor configured to encrypt a first cryptographic key with the session cryptographic key to generate a first encrypted message, the first cryptographic key being associated with identification of the first entity, and the first cryptographic key is a symmetric cryptographic key,
 wherein the first encrypted message is configured to be transmitted to the first entity via the wireless communication system by the transceiver.

9. The node as claimed in claim 8, wherein the node is an identity based cryptographic (IBC) private key generator (PKG), and wherein the node comprises memory storing the IBC public key, IBC private key and an identifier identifying the first entity.

10. The node as claimed in claim 9, wherein the processor is configured to generate a first entity IBC secret key dependent on the IBC public key, the IBC private key, and the identifier identifying the first entity.

11. The node as claimed in claim 10, wherein the first cryptographic key is the IBC first entity secret key.

12. The node as claimed in claim 8, wherein the node is a key server, and wherein the node comprises memory storing the key server public key and key server private key.

13. The node as claimed in claim 12, wherein the transceiver is configured to receive a second encrypted message from a second entity, and the processor is configured to decrypt the second encrypted message from the second entity using the key server private key to recover an identifier identifying the first entity and a second cryptographic key, wherein the first cryptographic key is the second cryptographic key.

14. A communication system comprising:
 a first apparatus comprising a processor, the processor configured to:
 select a first cryptographic key,
 encrypt a message with the first cryptographic key to produce a first encrypted message, and
 encrypt the first cryptographic key and an identifier of a second apparatus with a first encryption key to form a second encrypted message;
 the second apparatus configured to receive encrypted messages from the first apparatus via the communication system, the second apparatus comprising:
 a transceiver configured to receive the first encrypted message and further configured to authenticate the at least one second apparatus at a key node to receive a third encrypted message;
 a processor configured to decrypt the third encrypted message with a third cryptographic key to generate the first cryptographic key and decrypt the first encrypted message with the first cryptographic key to generate a decrypted message;
 a node configured to control communications in the communications system, the node comprising:
 a transceiver configured to receive an authentication request from the second apparatus and to receive a session cryptographic key; and
 a processor configured to encrypt the first cryptographic key with the session cryptographic key to generate the third encrypted message,
 wherein the encrypted message is configured to be transmitted to the second apparatus by the transceiver; and
 a store-and-forward server configured to receive the first encrypted message.

15. A communication system as claimed in claim 14, wherein the store-and-forward server is at least one of:
 a short message service centre (SMSC),
 a multimedia message service centre (MMSC);
 a electronic mail server; and
 a voicemail service centre.

16. A method comprising:
 selecting, by a first entity, a first cryptographic key, where the first cryptographic key is a symmetric cryptographic key;
 encrypting a message to be sent to a second entity with the first cryptographic key to produce a first encrypted message;
 encrypting the first cryptographic key and an identifier of the second entity with a first encryption key to form a second encrypted message, where the first encryption key is an asymmetric encryption key; and wirelessly transmitting the first encrypted message and the second encrypted message to the second entity via a store-and-forward node of a wireless communication system.

17. The method as claimed in claim 16, wherein the message is a text message, and wherein the identifier of the second entity is comprised of at least one of an International Mobile Subscriber Identity (IMSI), an Internet Protocol Multimedia Private Identity (IMPI), a Mobile Subscriber Integrated System Digital Number (MSISDN), a calling line identifier (CLF) and an IP Multimedia Public Identity (IMPU).

18. The method as claimed in claim 16, wherein the store-and-forward node is at least one of:
a short message service centre (SMSC);
a multimedia message service centre (MMSC);
a electronic mail server; and
a voicemail service centre.

19. The method as claimed in claim 16, wherein encrypting the first cryptographic key and the identifier of the second entity comprises encrypting using a identity based cryptographic (IBC) algorithm, and wherein the first encryption key is a Private Key Generator public key.

20. A method comprising:
selecting, by a first entity, a first cryptographic key, where the first cryptographic key is a symmetric cryptographic key;
encrypting a message to be sent to a second entity with the first cryptographic key to produce a first encrypted message;
encrypting the first cryptographic key and an identifier of the second entity with a first encryption key to form a second encrypted message, where the first encryption key is an asymmetric encryption key; and
wirelessly transmitting the first encrypted message and the second encrypted message to the second entity via a store-and-forward node of a wireless communication system;
wherein encrypting the first cryptographic key and the identifier of the second entity comprises encrypting using a public key cryptographic algorithm, and the first encryption key is a Key generator public key, further comprising wirelessly transmitting the second encrypted message to the Key generator.

21. The method as claimed in claim 16, wherein the first entity comprises a first user equipment configured for use with a cellular communication system.

22. The method as claimed in claim 16, wherein the first entity comprises a first user equipment and the second entity comprises a second user equipment, where both the first user equipment and the second user equipment are configured for use with a cellular communication system.

23. A method comprising:
receiving, at a network node of a wireless communication system, an authentication request from a first entity, the authentication request being received via the wireless communication system;
receiving a session cryptographic key, where the session cryptographic key is an asymmetric cryptographic key;
encrypting a first cryptographic key with the session cryptographic key to generate a first encrypted message, where the first cryptographic key is associated with an identification of the first entity and the first cryptographic key is a symmetric cryptographic key; and
transmitting to the first entity the first encrypted message via the wireless communication system.

24. The method as claimed in claim 23, wherein the network node is an identity based cryptographic (IBC) private key generator (PKG), and wherein the network node comprises memory storing the IBC public key, IBC private key and an identifier identifying the first entity.

25. The method as claimed in claim 24, comprising:
generating an IBC secret key of the first entity dependent on the IBC public key, the IBC private key, and the identifier identifying the first entity.

26. The method as claimed in claim 25, wherein the first cryptographic key is the IBC first entity secret key.

27. The method as claimed in claim 23, wherein the network node is a key server, and wherein the node comprises memory storing the key server public key and key server private key.

28. The method as claimed in claim 27, further comprising:
receiving a second encrypted message from a second entity; and
decrypting the second encrypted message using the key server private key to recover an identifier identifying the first entity and a second cryptographic key,
wherein encrypting a first cryptographic key with the session cryptographic key comprises encrypting the second cryptographic key with the session cryptographic key.

29. A computer program product embodied on a computer-readable storage device, the computer program product configured to provide a method comprising:
selecting, at a first entity, a first cryptographic key, where the first cryptographic key is a symmetric cryptographic key;
encrypting a text message to be sent to a second entity with the first cryptographic key to produce a first encrypted message;
encrypting the first cryptographic key and an identifier of the second entity with a first encryption key to form a second encrypted message, where the first encryption key is an asymmetric encryption key and where the identifier of the second entity is comprised of at least one of an International Mobile Subscriber Identity (IMSI), an Internet Protocol Multimedia Private Identity (IMPI), a Mobile Subscriber Integrated System Digital Number (MSISDN), a calling line identifier (CLF) and an IP Multimedia Public Identity (IMPU); and
wirelessly transmitting the first encrypted message and the second encrypted message from the first entity to the second entity via a store-and-forward node of a wireless communication system.

30. A computer program product embodied on a computer-readable storage device, the computer program product configured to perform a method comprising:
receiving an authentication request from a first entity via a wireless communication system;
receiving a session cryptographic key, where the session cryptographic key is an asymmetric cryptographic key;
encrypting a first cryptographic key with the session cryptographic key for generating a first encrypted message, the first cryptographic key being associated with identification of the first entity and the first cryptographic key is a symmetric cryptographic key; and
transmitting to the first entity the first encrypted message.

31. An apparatus comprising at least one processor; and at least one memory including computer program code, the at least one memory and the computer program code configured to, with the at least one processor, cause the apparatus to perform at least the following:
to select a first cryptographic key, where the first cryptographic key is a symmetric cryptographic key;

to encrypt a text message to be sent to a second entity with the first cryptographic key to produce a first encrypted message;

to encrypt the first cryptographic key and an identifier of the second entity with a first encryption key to form a second encrypted message, where the first encryption key is an asymmetric encryption key and where the identifier of the second entity is comprised of at least one of an International Mobile Subscriber Identity (IMSI), an Internet Protocol Multimedia Private Identity (IMPI), a Mobile Subscriber Integrated System Digital Number (MSISDN), a calling line identifier (CLF) and an IP Multimedia Public Identity (IMPU); and to wirelessly transmit the first encrypted message and the second encrypted message from the first entity to the second entity via a store-and-forward node of a wireless communication system.

32. An apparatus comprising at least one processor; and at least one memory including computer program code, the at least one memory and the computer program code configured to, with the at least one processor, cause the apparatus to perform at least the following:

to receive an authentication request from a first entity via a wireless communication system;

to receive a session cryptographic key, where the session cryptographic key is an asymmetric cryptographic key;

to encrypt a first cryptographic key with the session cryptographic key to generate a first encrypted message, where the first cryptographic key is associated with an identification of the first entity and the first cryptographic key is a symmetric cryptographic key; and to transmit to the first entity the first encrypted message via the wireless communication system.

* * * * *